United States Patent
Nakamoto et al.

(10) Patent No.: US 10,569,847 B2
(45) Date of Patent: Feb. 25, 2020

(54) MARITIME NAVIGATION ASSISTANCE SERVER SYSTEM AND MARITIME NAVIGATION ASSISTANCE METHOD

(71) Applicant: HONDA MOTOR CO., LTD., Tokyo (JP)

(72) Inventors: Go Nakamoto, Tokyo (JP); Kanako Ikeda, Tokyo (JP); Ryo Ueyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 15/558,242

(22) PCT Filed: Oct. 21, 2015

(86) PCT No.: PCT/JP2015/079673
§ 371 (c)(1),
(2) Date: Sep. 14, 2017

(87) PCT Pub. No.: WO2016/147463
PCT Pub. Date: Sep. 22, 2016

(65) Prior Publication Data
US 2018/0043976 A1 Feb. 15, 2018

(30) Foreign Application Priority Data

Mar. 18, 2015 (JP) .................................. 2015-055418
Mar. 18, 2015 (JP) .................................. 2015-055419

(51) Int. Cl.
*B63B 49/00* (2006.01)
*G01C 21/20* (2006.01)
(Continued)

(52) U.S. Cl.
CPC ............ *B63B 49/00* (2013.01); *G01C 21/203* (2013.01); *G06Q 10/047* (2013.01); *G06Q 50/30* (2013.01);
(Continued)

(58) Field of Classification Search
CPC ..... G01C 21/203; B63B 49/00; H04W 4/024; H04W 4/029; G08G 3/00; G06Q 50/30
(Continued)

(56) References Cited

U.S. PATENT DOCUMENTS

2011/0210865 A1    9/2011  Lee et al.
2014/0278064 A1*   9/2014  Lee .................... G01C 21/34
                                                          701/428

FOREIGN PATENT DOCUMENTS

JP    2004-354069 A    12/2004
JP    2005-101992 A     4/2005

OTHER PUBLICATIONS

International Search Report & Written Opinion dated Dec. 8, 2015 corresponding to International Patent Application No. PCT/JP2015/079673, and English translation thereof.
(Continued)

*Primary Examiner* — Nadeem Odeh
(74) *Attorney, Agent, or Firm* — Squire Patton Boggs (US) LLP

(57) ABSTRACT

The present invention contributes to vessel navigation safety, by applying conventional navigation technology and using smartphones or other wireless communication terminals to provide a chart according to vessel type. Provided is a server system (3), which: receives, from wireless communication terminals (2) which are carried by users aboard vessels (4), position information of the wireless communication terminals (2) and information of the sizes of the vessels (4); creates, in response to the sizes of the vessels,
(Continued)

navigation trajectory information formed from time series position information of the vessels (4); and, with the navigation trajectory information as an input, updates navigable course information for each size of the vessels (4).

18 Claims, 6 Drawing Sheets

(51) Int. Cl.
*H04W 4/029* (2018.01)
*H04W 4/024* (2018.01)
*G06Q 50/30* (2012.01)
*G08G 3/00* (2006.01)
*G09B 29/10* (2006.01)
*H04W 4/40* (2018.01)
*G06Q 10/04* (2012.01)
*H04W 4/02* (2018.01)

(52) U.S. Cl.
CPC ............... *G08G 3/00* (2013.01); *G09B 29/10* (2013.01); *H04W 4/024* (2018.02); *H04W 4/029* (2018.02); *H04W 4/40* (2018.02); *H04W 4/026* (2013.01)

(58) Field of Classification Search
USPC ........................... 701/21, 425, 450, 461, 521
See application file for complete search history.

(56) References Cited

OTHER PUBLICATIONS

Daisuke Shibata et al., "Development of an Application to Prevent the Collision Accidents for Small Boats Using Smartphones," Dai 75 Kai (Heisei 25 Nen) Zenkoku Taikai Koen Ronbunshu (3) Network Security, Mar. 6, 2013, pp. 167, 168.
Umi no Chizu Navi', [online], Aug. 17, 2010, URL:http://www.womanapps.net/news_Rwl1W9vql.html.

\* cited by examiner

NAVIGATION TRAJECTORY

SEA ROUTE MAP CREATED BY SERVER

MARITIME NAVIGATION ASSISTANCE SERVER SYSTEM AND MARITIME NAVIGATION ASSISTANCE METHOD

TECHNICAL FIELD

The present invention relates to a marine navigation assistance system, including a wireless communication terminal having a GPS mounted thereon, and a server system. Particularly, the present invention relates to a marine navigation assistance server system and terminal, which employs the configuration of an existing car navigation system for land roads, and which is capable of contributing to the safe navigation of vessels by allowing a server system to provide navigable sea route information of a vessel on the basis of position information and a vessel type received from wireless communication terminals to the wireless communication terminals and to update the navigable sea route information of the vessel using a displacement of a vessel and the trajectory of the position information of the vessel collected from each of the wireless communication terminals.

BACKGROUND ART

Conventionally, with regard to marine safety, a marine traffic control center provides information to navigating vessels and controls navigation so that a huge vessel or the like can navigate sea routes safely. However, the service area is limited and the service is limited to specific vessels having an automatic identification system (AIS).

In contrast, in recent years there have been increasing marine accidents (for example, vessels being stranded on an underwater rock, fixed fishing nets, and the like) with a further increase in the number of people who own vessels other than fishing boats and cargo-passenger boats, which are mainly for leisure, such as yachts, cruisers, motorboats, or sport fishing boats (hereinafter these vessels will be referred to as "pleasure boats").

According to statistical data, 80% of marine accidents in Japan occurs within 3 nautical miles from the coast, and 94% of marine disasters involving fatalities and missing persons are attributable to small vessels such as a fishing boat, a sport fishing boat, or a pleasure boat. Few small vessels have expensive marine navigation equipment. There is a need for inexpensive and highly reliable marine navigation equipment onboard these vessels.

Due to this, a technology of notifying a subject station (a client) of a danger by communication between the subject station mounted on a vessel and a key station (a server) on land has been developed as a technology for allowing a vessel to avoid a danger of stranding or the like.

For example, Patent Document 1 discloses a method in which a measurement instrument for meteorological information is provided in a fishing boat, a pleasure boat, or the like of a contracted customer, the measurement instrument measuring the current position information at sea of a vessel to which the measurement instrument is attached and the meteorological information of a sea area where the vessel is present, the measurement information being transmitted to a server, and the server has a displacement of the vessel registered therein and aggregates the received position information and meteorological information of the vessel to thereby display the meteorological information on a map and calculate the degree of danger of the vessel on the basis of the meteorological information and the displacement of the vessel, the server displaying danger information and outputting a warning message to allow the user to access the server and receive the meteorological information.

Patent Document 2 discloses a coastal and shore information system in which a server distributes marine safety information to a mobile terminal which is possessed by a user who is aboard a vessel and of which the position can be specified, and which includes a distribution controller that controls distribution of marine safety information on the basis of an evaluation result of at least one selected from a terminal position of the mobile terminal, a current time, a vessel size, a vessel type, a heading direction, a vessel speed, a destination, and the purpose of boarding.

A technology of providing route guidance from a current position to a destination during driving of an automobile or walking using an application installed on a mobile communication terminal such as a mobile phone or a smartphone is widely used as a navigation technology for land roads. In this technology, the current position measured by the GPS provided in the mobile communication terminal can be plotted and displayed on a road map provided in a server or the mobile communication terminal using a technology typically called a "map matching". Moreover, when a user inputs a destination on a wireless communication terminal, a route from a current position to the destination can be computed by a server or a mobile communication terminal and route guidance can be provided to the user.

Patent Document 1: Japanese Unexamined Patent Application, Publication No. 2004-354069

Patent Document 2: Japanese Unexamined Patent Application, Publication No. 2005-101992

DISCLOSURE OF THE INVENTION

Problems to be Solved by the Invention

A sea route map has the following characteristics, different to a road map used in navigation technology for land roads. First, a navigable sea route of a vessel is different depending on displacement (tonnage). In other words, since the depth of water that a vessel can pass through is different depending on a vessel, and the degree of danger of stranding increases as the tonnage increases, the navigable sea route of the vessel is limited. Furthermore, the depth of water changes depending on the rise and fall of the tide. The navigable sea route also changes depending on the conditions, such as the date and time, and the displacement.

Among the conventional technologies, according to the navigation technology for land roads, since the sizes of vehicles such as automobiles are limited, and there is no great difference between roads on which the vehicles can travel unless the vehicles are special vehicles, it is possible to provide route guidance that is uniform to any vehicles. Due to this, when the navigation technology for land roads is applied to marine vehicles, it is not possible to solve problems such as safe navigation. Since the invention disclosed in Patent Document 1 needs to be equipped with a measurement instrument and to have a displacement registered in advance, there is a difficulty in introduction that this invention incurs the labor of an administrator. In Patent Document 2, such labor can be avoided by equipping a device capable of receiving AIS or a device such as a navigation system as means for constantly checking detailed changes in marine situations. However, such a device is expensive for beginners of marine leisure sports, and there is a need to lower the entry barrier to these sports by substituting the device with a less expensive and more familiar device.

Since some users of boats navigating the sea are inexperienced in determining the marine situation due to lack of experience, and are unable to select a destination and accurately understand changes in the marine situation, such boats may result in marine accidents. Thus, it is desirable to provide a technology which provides safety and facility to all people, ranging from beginners to experts of marine leisure sports.

An object of the present invention is to provide a sea route map corresponding to a vessel type by a simple method while using a conventional navigation technology to thereby provide a system mountable on a wireless communication terminal such as a smartphone and to contribute to vessel navigation safety.

Means for Solving the Problems (1) A server system (for example, a server system 3 to be described later) which is communicably connected to a wireless communication terminal (for example, a wireless communication terminal 2 to be described later), the server system including: a wireless unit (for example, a wireless unit 32 to be described later); a control unit (for example, a control unit 30 to be described later); and a storage unit (for example, a storage unit 31 to be described later) that stores navigable sea route information for each vessel size, wherein the control unit includes: a vessel information receiving unit (for example, a current position information processing unit 302 to be described later) that receives position information of the wireless communication terminal and information on the vessel size from the wireless communication terminal carried by a user who is aboard the vessel via the wireless unit; a navigation history creation and updating unit (for example, a navigation history creation and updating unit 304 to be described later) that creates navigation trajectory information including time-series position information of the vessel so as to correspond to the vessel size; and a sea route information creation and updating unit (for example, a sea route information creation and updating unit 305 to be described later) that updates the navigable sea route information for each vessel size, stored in the storage unit on the basis of the navigation trajectory information created by the navigation history creation and updating unit.

According to the server system of (1), it is possible to create and update the navigable sea route information for each vessel size on the basis of the vessel size and the vessel navigation trajectory received from the wireless communication terminal 2. By doing so, it is possible to provide sea route information (a sea route map) having past records according to a vessel type using a system which can be mounted on a wireless communication terminal such as a smartphone instead of equipping a device capable of receiving AIS or a device such as a navigation system.

(2) The server system of (1) in which the vessel information receiving unit (for example, a current position information processing unit 302 to be described later) further receives reliability of the information on the vessel size from the wireless communication terminal (for example, a wireless communication terminal 2 to be described later), and the sea route information creation and updating unit (for example, a sea route information creation and updating unit 305 to be described later) further updates the navigable sea route information for each vessel size, stored in the storage unit (for example, a storage unit 31 to be described later) on the basis of the navigation trajectory information created by the navigation history creation and updating unit (for example, a navigation history creation and updating unit 304 to be described later) so as to correspond to the vessel size and the reliability of the information on the vessel size.

According to the server system of (2), it is possible to update the sea route information more appropriately on the basis of the reliability of information even when a wrong displacement is input (reported) by a user's manual input, for example.

(3) The server system of (1) or (2) in which the storage unit (for example, a storage unit 31 to be described later) further stores a performance level based on past navigation records of the sea route information together with the navigable sea route information for each vessel size, and the sea route information creation and updating unit (for example, a sea route information creation and updating unit 305 to be described later) further updates the performance level based on the past navigation records of the navigable sea route information for each vessel size.

According to the server system of (3), a sea route in which the past navigation record has a large performance level, for example, can be displayed as a bold line on the wireless communication terminal, and a safer sea route can be effectively presented to users like a wide arterial road on land, for example.

(4) A sea route information creation and updating method wherein a server system (for example, a server system 3 to be described later) which includes a wireless unit (for example, a wireless unit 32 to be described later), a storage unit (for example, a storage unit 31 to be described later) that stores navigable sea route information for each vessel size, and a control unit (for example, a control unit 30 to be described later), and which is communicably connected to a wireless communication terminal (for example, a wireless communication terminal 2 to be described later) to update the navigable sea route information for each vessel size stored in the storage unit, the method causing the control unit to execute: a vessel information receiving step of receiving position information of the wireless communication terminal and information on the vessel size from the wireless communication terminal carried by a user who is aboard the vessel via the wireless unit; a navigation history creation and updating step of creating navigation trajectory information including time-series position information of the vessel so as to correspond to the vessel size; and a sea route information creation and updating step of updating the navigable sea route information for each vessel size, stored in the storage unit on the basis of the navigation trajectory information created in the navigation history creation and updating step.

(5) The sea route information creation and updating method of (4) in which the vessel information receiving step further involves receiving reliability of the information on the vessel size from the wireless communication terminal (for example, a wireless communication terminal 2 to be described later), and the sea route information creation and updating step further involves updating the navigable sea route information for each vessel size, stored in the storage unit on the basis of the navigation trajectory information created by the sea route information creation and updating step so as to correspond to the vessel size and the reliability of the information on the vessel size.

(6) The sea route information creation and updating method of (4) or (5) in which the storage unit further stores a performance level based on past navigation records of the sea route information together with the navigable sea route information for each vessel size, and the sea route information creation and updating step further involves updating the performance level based on the past navigation records of the navigable sea route information for each vessel size.

According to the methods of (4) to (6), the same advantages as those of the server systems of (1) to (3) can be obtained.

(7) A server system (for example, a server system 3 to be described later) which is communicably connected to a wireless communication terminal (for example, a wireless communication terminal 2 to be described later), the server system including: a wireless unit (for example, a wireless unit 32 to be described later); a control unit (for example, a control unit 30 to be described later); and a storage unit (for example, a storage unit 31 to be described later) that stores navigable sea route information for each vessel size, wherein the control unit includes: a vessel information receiving unit (for example, a current position information processing unit 302 to be described later) that receives position information of the wireless communication terminal, information on the vessel size, and reliability of the information on the vessel size from the wireless communication terminal carried by a user who is aboard a vessel via the wireless unit; a sea route map information selection unit (for example, a sea route map information selection unit to be described later) that selects navigable sea route information of the vessel from the storage unit on the basis of the magnitude of the vessel and the reliability of the information on the vessel size received by the vessel information receiving unit; and a sea route map information distribution unit (for example, a sea route map information distribution unit to be described later) that distributes the sea route information selected by the sea route map information selection unit to the wireless communication terminal together with a nautical chart.

According to the server system of (7), it is possible to select sea route information suitable for the vessel information (particularly a vessel's displacement) and the reliability of the vessel information on the basis of the current position of the wireless communication terminal 2 (the current position of a vessel 4).

(8) The server system of (7) in which the sea route map information selection unit (for example, a sea route map information selection unit to be described later) further changes the information on the vessel size to be larger than the received vessel size when the reliability of the information on the vessel size received from the wireless communication terminal (for example, a wireless communication terminal 2 to be described later) is low (for example, the information is manually input) and selects the navigable sea route information of the vessel from the storage unit.

According to the server system of (8), since the displacement is changed to a displacement larger than the manually input value and the sea route information is selected, even when a wrong displacement is input (reported) by a user's manual input, it is possible to select a safe sea route map.

(9) The server system of (7) or (8), wherein the sea route map information selection unit (for example, a sea route map information selection unit to be described later) further changes the vessel size to a predetermined size when the information on the vessel size is not input from the wireless communication terminal (for example, a wireless communication terminal 2 to be described later) and selects the navigable sea route information of the vessel from the storage unit.

According to the server system of (9), even when the vessel size is not input, it is possible to select the safest sea route map (that is, the sea route information for vessels having a large displacement).

(10) The server system of any one of (7) to (9) in which the storage unit further stores a performance level based on past navigation records of the sea route information together with the navigable sea route information for each vessel size, and the sea route map information distribution unit further distributes the sea route information selected by the sea route map information selection unit together with the performance level of the sea route information.

According to the server system of (10), a sea route in which the past navigation record has a large performance level can be displayed as a bold line on the wireless communication terminal, and a safer sea route can be effectively presented to users like a wide arterial road on land, for example.

(11) A sea route map information providing method for providing sea route map information to a wireless communication terminal to which a server system including a wireless unit (for example, a wireless unit 32 to be described later), a storage unit (for example, a storage unit 31 to be described later) that stores navigable sea route information for each vessel size, and a control unit (for example, a control unit 30 to be described later) is communicably connected, the method causing the control unit to execute: a vessel information receiving step (for example, a current position information processing step to be described later) of receiving position information of the wireless communication terminal, information on the vessel size, and reliability of the information on the vessel size from the wireless communication terminal carried by a user who is aboard a vessel via the wireless unit; a sea route map information selection step (for example, a sea route map information selection step to be described later) of selecting navigable sea route information of the vessel from the storage unit (for example, a storage unit 31 to be described later) on the basis of the magnitude of the vessel and the reliability of the information on the vessel size received in the vessel information receiving step; and a sea route map information distribution step (for example, a sea route map information distribution step to be described later) of distributing the sea route information selected in the sea route map information selection step to the wireless communication terminal together with a nautical chart.

(12) The sea route map information providing method of (11) in which the sea route map information selection step further involves changing the information on the vessel size to be larger than the received vessel size when the reliability of the information on the vessel size received in the vessel information receiving step is low (for example, the information is manually input) and selects the navigable sea route information of the vessel from the storage unit.

(13) The sea route map information providing method of (11) or (12) in which the sea route map information selection step further involves changing the vessel size to a predetermined size when the information on the vessel size is not input in the vessel information receiving step and selecting the navigable sea route information of the vessel from the storage unit (for example, a storage unit 31 to be described later).

(14) The sea route map information providing method of any one of (11) to (13) in which the storage unit (for example, a storage unit 31 to be described later) further stores a performance level based on past navigation records of the sea route information together with the navigable sea route information for each vessel size, and the sea route map information distribution step further involves distributing the sea route information selected in the sea route map information selection step together with the performance level of the sea route information.

According to the methods of (11) to (14), the same advantages as those of the server systems of (7) to (10) can be obtained.

Effects of the Invention

According to the present invention, it is possible to provide a sea route map corresponding to a vessel type by a simple method while using a conventional navigation technology to thereby provide a system mountable on a wireless communication terminal such as a smartphone and to contribute to vessel navigation safety. According to the present invention, since beginners of marine leisure sports can use sea route information and the like having past records from a wireless communication terminal instead of equipping a device capable of receiving AIS or a device such as a navigation system, it is possible to lower the entry barrier to marine leisure sports. Moreover, since the detailed navigation information of a vessel is uploaded to the server system, when a certain problem occurs, it is possible to refer to the past navigation records of the vessel.

PREFERRED MODE FOR CARRYING OUT THE INVENTION

First Embodiment

Hereinafter, a preferred embodiment of a navigation system according to the present invention will be described with reference to FIGS. 1 to 6.
[Functional Configuration of Marine Navigation Assistance System]
A configuration of a marine navigation assistance system according to a preferred embodiment of the present invention will be described.

Figure 1:
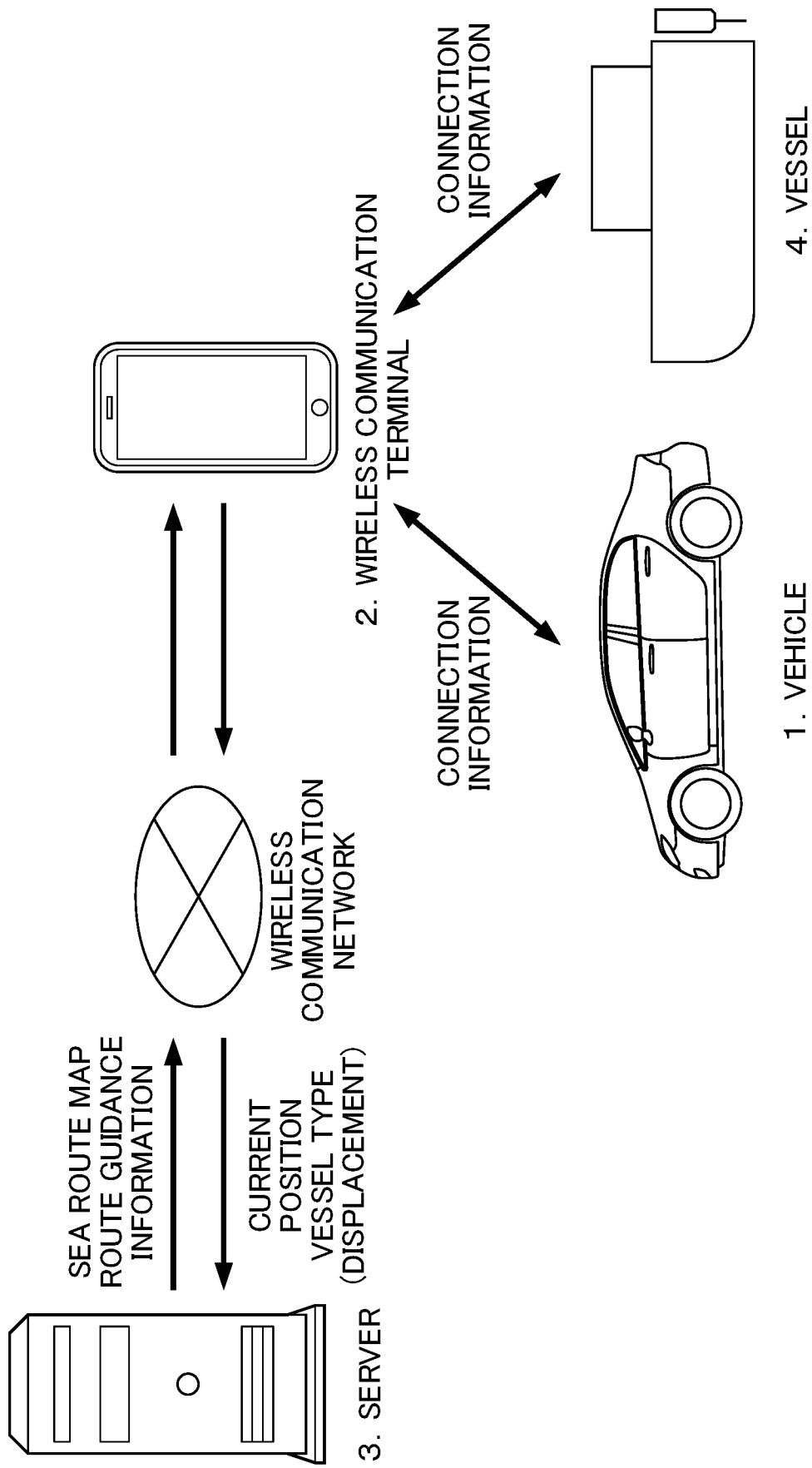
FIG. 1 is a diagram illustrating a system configuration of a navigation system 100.

As illustrated in FIG. 1, a marine navigation assistance system is configured to include a land vehicle 1 including a two-wheeled vehicle, a four-wheel passenger car, and the like, a vessel 4 including a pleasure boat, a small vessel, and the like, a wireless communication terminal 2, and a server system 3 capable of transmitting and receiving data to and from the wireless communication terminal 2.

The wireless communication terminal 2 is a smartphone, a tablet terminal, a PDA, a note PC, and other portable electronic devices including a cellular phone, and includes an electronic device having a wireless communication function. Various application software can be installed in the wireless communication terminal 2. In the present embodiment, the wireless communication terminal 2 recognizes (receives connection information) the type (particularly, a displacement of the vessel 4) of the vehicle 1 or the vessel 4 using proximity wireless communication means or the like, and connects to the server system 3 to transmit and receive data.

Software such as a navigation (a route guidance) or the like is installed in the wireless communication terminal 2. On land, where a user carrying the wireless communication terminal 2 is riding in the vehicle 1, the wireless communication terminal 2 can display a road map acquired from the server system 3 on the basis of a user's request and provide a route guidance from a current position to a destination.

Moreover, a sea route guidance software is installed in the wireless communication terminal 2. On the sea where a user carrying the wireless communication terminal 2 is aboard the vessel 4, the wireless communication terminal 2 can display a nautical chart and navigable sea route information acquired from the server system 3 on the basis of a user's request and provide a navigable sea route guidance.

The software such as a navigation (a route guidance) and the software such as a sea route guidance may be installed in advance. The software may be downloaded appropriately as necessary upon transmitting and receiving data to and from the server system 3. For example, when the software such as a navigation (a route guidance) and the software such as a sea route guidance are implemented by a Web application that runs on a browser, the software can be downloaded appropriately as necessary upon transmitting and receiving data to and from the server system 3.

The server system 3 can transmit and receive data to and from the wireless communication terminal 2 via a communication unit 32. The type (a displacement) of the vessel 4 and the navigation trajectory acquired via the wireless communication terminal 2 are stored in the server system 3 as well as the nautical chart and the navigable sea route information. Moreover, a program for rewriting a sea route map on the basis of the navigation trajectory, a program for generating and updating navigable sea route information on the basis of the type of the vessel 4, and a program for computing a route to the destination corresponding to the navigable sea route information are stored in the server system 3. The server system 3 distributes navigable sea route information to the wireless communication terminal 2 on the basis of a request of the wireless communication terminal 2.

In the embodiment of the present invention, although the server system 3 is depicted as one server, the server system 3 may be a distributed processing system in which the respective functions of the server system 3 are distributed appropriately to a plurality of servers. Moreover, the respective functions of the server system 3 may be realized on a cloud using a virtual server function or the like. Moreover, the server system 3 may be a server system which includes a plurality of servers such as a Web server, an application server, and a database server, for example.

Next, the respective configurations will be described.
<Wireless Communication Terminal 2>

Figure 2:
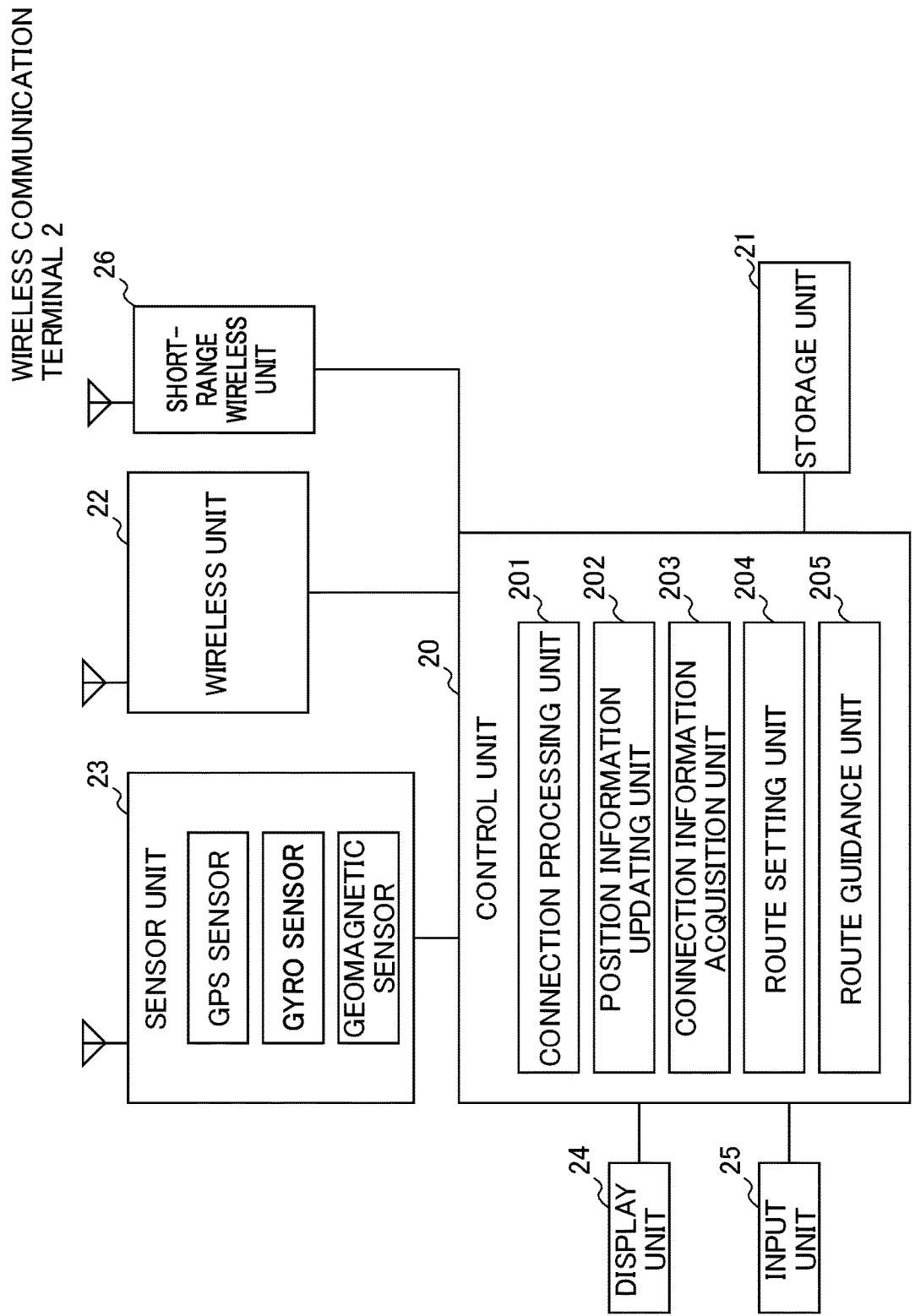
FIG. 2 is a diagram illustrating a configuration of a wireless communication terminal 2.

As illustrated in FIG. 2, the wireless communication terminal 2 includes at least a control unit 20, a storage unit 21, a wireless unit 22, a sensor unit 23, a display unit 24, and an input unit 25. The wireless communication terminal 2 may further include a short-range wireless unit 26.

The control unit 20 is configured as a microprocessor that includes a CPU, a RAM, a ROM, an I/O, and the like. The CPU executes programs read from the ROM or the storage unit 21, and during execution of the programs, reads information from the RAM, the ROM, and the storage unit 21, writes information to the RAM and the storage unit 21, and exchanges signals with the wireless unit 22, the sensor unit 23, the display unit 24, the input unit 25, the short-range wireless unit 26, and the like. The details thereof will be described later.

The storage unit 21 is configured as a semiconductor memory or the like and stores an operating system (OS), various programs for route guidance, various programs for sea route guidance, and various items of information such as road map information, road link information, nautical chart information, navigable sea route information, various parameters set by users, and position information. The road map information, the road link information, the nautical chart information, the navigable sea route information, and the like may be stored in advance in the storage unit 21. Moreover, these items of information may be acquired appropriately from the server system 3.

The wireless unit 22 includes a DSP (Digital Signal Processor) or the like and is configured to perform wireless communication via a wireless communication network represented by a cellular phone network such as 3G or LTE and perform wireless communication with the server system 3. The cellular phone network enables terminals to transmit and receive data to a location, for example, approximately 15 km from land. The wireless unit 22 can transmit current position information of the wireless communication terminal 2, an ID (hereinafter referred to as a "user ID") and a password for identifying a service subscription state, vehicle information (for example, a vehicle ID, a vehicle type, a number plate, and the like), a vehicle state (for example, an ignition-on state, a traveling state, an ignition-off state, and the like), vehicle destination information, vessel information (for example, a vessel name, a vessel type, a vessel's displacement, and the like), a vessel state (for example, a navigation state, a vessel direction, a vessel speed, a fuel state, mileage information, and the like), and the like to the server system 3 and receive vehicle route information, navigable sea route map information of the vessel, and the like from the server system 3.

The sensor unit 23 includes a GPS sensor, a gyro sensor, a geomagnetic sensor, and the like. The sensor unit 23 has the function of position detection means for detecting the current position, and receives a GPS satellite signal using a GPS sensor to measure the current position (latitude and longitude) of the wireless communication terminal 2. Moreover, when GPS communication is not possible, it is possible to calculate the current position of the vehicle 1 on the basis of base station information acquired from the wireless unit 22 using assisted global positioning system (AGPS) communication.

The display unit 24 is configured as a display device such as a liquid crystal display or an organic EL panel and displays an image according to an instruction received from the control unit 20. The display unit 24 displays various items of information such as the current position of the wireless communication terminal 2, map information (a road map or a nautical chart) near the current position of the wireless communication terminal 2 read from the storage unit 21, the route information of the vehicle 1 acquired from the server system 3, and the navigable sea route information of the vessel.

The input unit 25 includes an input device (not illustrated) such as physical switches called numeric keys and a touch panel provided to be superimposed on a display surface of the display unit 24. A signal based on an operation (for example, pressing of numeric keys or touching of a touch panel) input from the input unit 25 is output to the control unit 20 whereby an operation of determining a stopover facility, zooming in and out of a map can be performed.

The wireless communication terminal 2 may include the short-range wireless unit 26 which uses non-contact communication called near field communication (NFC), for example.

In recent years, the vehicle 1 includes automatic recognition means such as a short-range wireless unit (for example, Bluetooth (registered trademark) Wi-Fi, and the like) and can notify of vehicle information and a vehicle state via the short-range wireless unit. Due to this, the wireless communication terminal 2 having the short-range wireless unit 26 can acquire the vehicle information and the vehicle state by communicating with a short-range wireless unit of the vehicle 1.

Moreover, the vessel 4 like a pleasure boat includes automatic recognition means such as a short-range wireless unit (for example, Bluetooth (registered trademark) Wi-Fi, and the like) and can notify of vessel information, position information, and positioning accuracy information via the short-range wireless unit. Due to this, the wireless communication terminal 2 having the short-range wireless unit 26 can acquire the vessel information, the vessel state, and the like by communicating with a short-range wireless unit of the vessel 4.

In this manner, the wireless communication terminal 2 can acquire information on whether the user is riding in the vehicle 1 or is aboard the vessel 4 by communicating with the vehicle 1 and the vessel 4 via the short-range wireless unit 26. Although not illustrated in the drawings, the wireless communication terminal 2 may include a short-range cable communication unit separately from the short-range wireless unit 26.

The control unit 20 executes the respective programs (hereinafter also referred to collectively as a "route guidance and sea route guidance application") to allow the wireless communication terminal 2 to function as predetermined means (hereinafter referred to collectively as a "route guidance and sea route guidance unit"). For example, when the user is riding in the vehicle 1 and the programs for route guidance are activated, route guidance that instructs left and right turns while displaying the current position using the position information from the sensor unit 23 can be realized. Moreover, when the user is aboard the vessel 4 and the programs for sea route guidance are activated, guidance of a navigable sea route map around the current position corresponding to the displacement of the vessel can be realized while displaying the current position using the position information from the sensor unit 23 (particularly, the GPS sensor). Moreover, when the software such as a navigation (a route guidance) and the software such as a sea route guidance are implemented by a Web application that runs on a browser, these items of software are downloaded appropriately as necessary upon transmitting and receiving data to and from the server system 3, whereby the route guidance and sea route guidance can be realized. Moreover, the control unit 20 executes the respective programs for the route guidance and sea route guidance to allow the wireless communication terminal 2 to execute predetermined procedures (hereinafter also referred to collectively as a "route guidance and sea route guidance procedure").

Hereinafter, the functions of the control unit 20 will be described from the viewpoint of a route guidance and sea route guidance unit. The description based on the viewpoint of the wireless communication terminal guidance procedure (method) will not be provided since the same description is applied to a wireless communication terminal guidance unit by replacing "unit" with "procedure".

As illustrated in FIG. 2, the control unit 20 includes a connection processing unit 201, a position information updating unit 202, a connection information acquisition unit 203, a route setting unit 204, and a route guidance unit 205.

<Connection Processing Unit 201>

When a route guidance and sea route guidance application is activated by a user, the connection processing unit 201 turns on a GPS sensor or the like, executes a login process to the server system 3, for example, using a user ID and a password, and transmits the current position information of the wireless communication terminal 2 calculated by the sensor unit 23 and the current time information or the like acquired from a clock unit (not illustrated) to the server system 3. The transmitted information may include a state indicating whether the user carrying the wireless communication terminal 2 is riding in the vehicle 1 or is aboard the vessel 4, acquired from the connection information acquisition unit 203 to be described later. When the user is riding in the vehicle 1, the transmitted information may include vehicle information and a vehicle state. When the user is aboard the vessel 4, the transmitted information may include vessel information and a vessel state. When the user ends the activation of the route guidance and sea route guidance of the wireless communication terminal 2, the route guidance and sea route guidance stops its function.

<Position Information Updating Unit 202>

When the wireless communication terminal 2 is within a communication range of the cellular phone network, the position information updating unit 202 periodically transmits the user ID, the current position information of the wireless communication terminal 2 calculated by the sensor unit 13, the current time information acquired from the clock unit (not illustrated), the vehicle state when the user is riding in the vehicle 1, and the vessel state when the user is aboard the vessel 4 to the server system 3 until the route guidance and sea route guidance application of the wireless communication terminal 2 ends.

When the wireless communication terminal 2 is outside the communication range of the cellular phone network, the position information updating unit 202 periodically records the user ID, the current position information of the wireless communication terminal 2, the current time information, the vehicle state when the user is riding in the vehicle 1, and the vessel state when the user is aboard the vessel 4 in a work area of the storage unit 21 until the route guidance and sea route guidance application of the wireless communication terminal 2 ends. When the wireless communication terminal 2 has re-entered the communication range of the cellular phone network, the position information updating unit 202 uploads the position information and the like recorded in the work area when the wireless communication terminal was outside the communication range collectively to the server system 3.

The position information updating unit 202 can transmit (in a so-called burst transmission mode) a plurality of items of information (for example, the current position information, and the current time information, and the like of the wireless communication terminal 2 for five minutes) at a time rather than transmitting the current position information, the current time information, and the like of the wireless communication terminal 2 acquired at a predetermined time interval (for example, every three seconds), the vehicle state when the user is riding on the vehicle 1, and the vessel state when the user is aboard the vessel 4 to the server system 3 on a realtime basis. The acquisition time interval of the current position information and the like of the wireless communication terminal 2 and the number of items of information transmitted at a time when a plurality of items of information are transmitted in a burst mode, and the like can be set in advance as parameters in the storage unit 21 of the wireless communication terminal 2 via a parameter setting screen, for example.

By doing so, when the user is aboard the vessel 4, the server system 3 can create and update the navigation trajectory information including the type (a displacement) of the vessel, a navigation trajectory, and the like on the basis of the current position information, the current time information, the vessel state, and the like of the wireless communication terminal 2 transmitted from the wireless communication terminal 2 with the aid of the navigation history creation and updating unit 304.

<Connection Information Acquisition Unit 203>

The connection information acquisition unit 203 can acquire information on whether the user carrying the wireless communication terminal 2 is riding in the vehicle 1 or is aboard the vessel 4, the vehicle information and the vehicle state when the user is riding in the vehicle 1, and the vessel information and the vessel state when the user is aboard the vessel 4 by communicating with the vehicle 1 or the vessel 4 via the short-range wireless unit 26.

The connection information acquisition unit 203 can transmit the vehicle information and the vehicle state acquired from the vehicle 1 when the user is riding in the vehicle 1 or the vessel information and the vessel state acquired from the vessel 4 when the user is aboard the vessel 4 via the short-range wireless unit 26 to the server system 3 via the wireless unit 22. By doing so, the server system 3 can determine whether the user is riding in the vehicle 1 or is aboard the vessel 4 on the basis of the connection information transmitted from the wireless communication terminal 2 with the aid of the on-board determination processing unit 303 to be described later. When the user gets off the vehicle 1 and goes aboard the vessel 4, the on-board determination processing unit 303 of the server system 3 determines that the user is aboard the vessel 4, and the route calculation unit 306 to be described later performs a route calculation process from land route information to sea route information.

When the wireless communication terminal 2 is unable to communicate with the vehicle 1 or the vessel 4 via the short-range wireless unit 26, the connection information acquisition unit 203 displays an input screen for the vessel information (particularly a vessel's displacement) on the display unit 24. By doing so, the connection information acquisition unit 203 can acquire the vessel information (particularly, the vessel's displacement) of the vessel 4 input by the user via the input screen. However, in this case, if a wrong displacement or the like is input (reported), the vessel itself will be endangered, it is preferable that the sea route information distributed to the wireless communication terminal 2 from the server system 3 corresponds to a displacement larger than the input displacement.

Due to this, the connection information acquisition unit 203 transmits the vessel information (particularly the vessel's displacement) to the server system 3 together with the reliability information of the vessel information (particularly, the vessel's displacement). The reliability information may be information on the input source of the vessel information (particularly the vessel's displacement). In this case, for example, the reliability is high when the wireless communication terminal 2 has acquired the vessel information (particularly the vessel's displacement) by proximity wireless communication (that is, when the input source is proximity wireless communication), whereas the reliability is low when the wireless communication terminal 2 has acquired the vessel information (particularly the vessel's displacement) by manual input (that is, when the input source is manual input). Instead of manual input, for example, when the vessel information (particularly the vessel's displacement) of the vessel 4 is registered in advance in the wireless communication terminal 2 (that is, the input source is registered in advance), the reliability may be increased. In this manner, the reliability information of the vessel information (particularly the vessel's displacement) can be determined depending on the data input source. When the vessel information (particularly the vessel's displacement) is not acquired by the short-range wireless unit 26 and the displacement is not manually input, if position information indicating the user is at sea is uploaded to the server system 3, safest sea route information (that is, the data for vessels having a large displacement) may be transmitted to the wireless communication terminal 2.

<Route Setting Unit 204>

The route setting unit 204 displays a screen for inputting a destination or the like for a route guidance to users via the display unit 24. In this case, the route setting unit 204 specifies the current position (latitude and longitude) using the sensor unit 23 and sets the current position as a default departure position. The route setting unit 204 sets the destination input from the user via the input unit 25. The route setting unit 204 transmits destination information and the like to the server system 3 via the wireless unit 22.

<Route Guidance Unit 205>

The route guidance unit 205 executes a road route guidance on the basis of the route information received from the server system 3 when the user is riding in the vehicle 1 as described above. After that, when the user gets off the vehicle 1 and goes aboard the vessel 4, the connection information acquisition unit 203 transmits information indicating that the user is aboard the vessel 4 to the server system 3 via the wireless unit 22 as described above. By doing so, the on-board determination processing unit 303 of the server system 3 can switch the route setting mode of the route calculation unit 306 from land navigation to marine navigation. As will be described later, the route calculation unit 306 of the server system 3 retrieves sea route information suitable for the vessel information (particularly, the vessel's displacement) on the basis of the current position of the wireless communication terminal 2 (the current position of the vessel 4) and transmits the selected sea route information to the wireless communication terminal 2. By doing so, when the user is aboard the vessel 4, the route guidance unit 205 can provide guidance of navigable sea route information near the current position corresponding to the vessel's displacement on the basis of the nautical chart and the navigable sea route information of the vessel 4 received from the server system 3. In this way, when the wireless communication terminal 2 starts route guidance and the user gets off the vehicle 1 and goes aboard the vessel 4, it is possible to continue the sea route guidance.

When the route guidance or the sea route guidance by the route guidance unit 205 of the wireless communication terminal 2 is not used, the task of the route guidance unit 205 may be ended.

Next, the server system 3 will be described.

Figure 3:
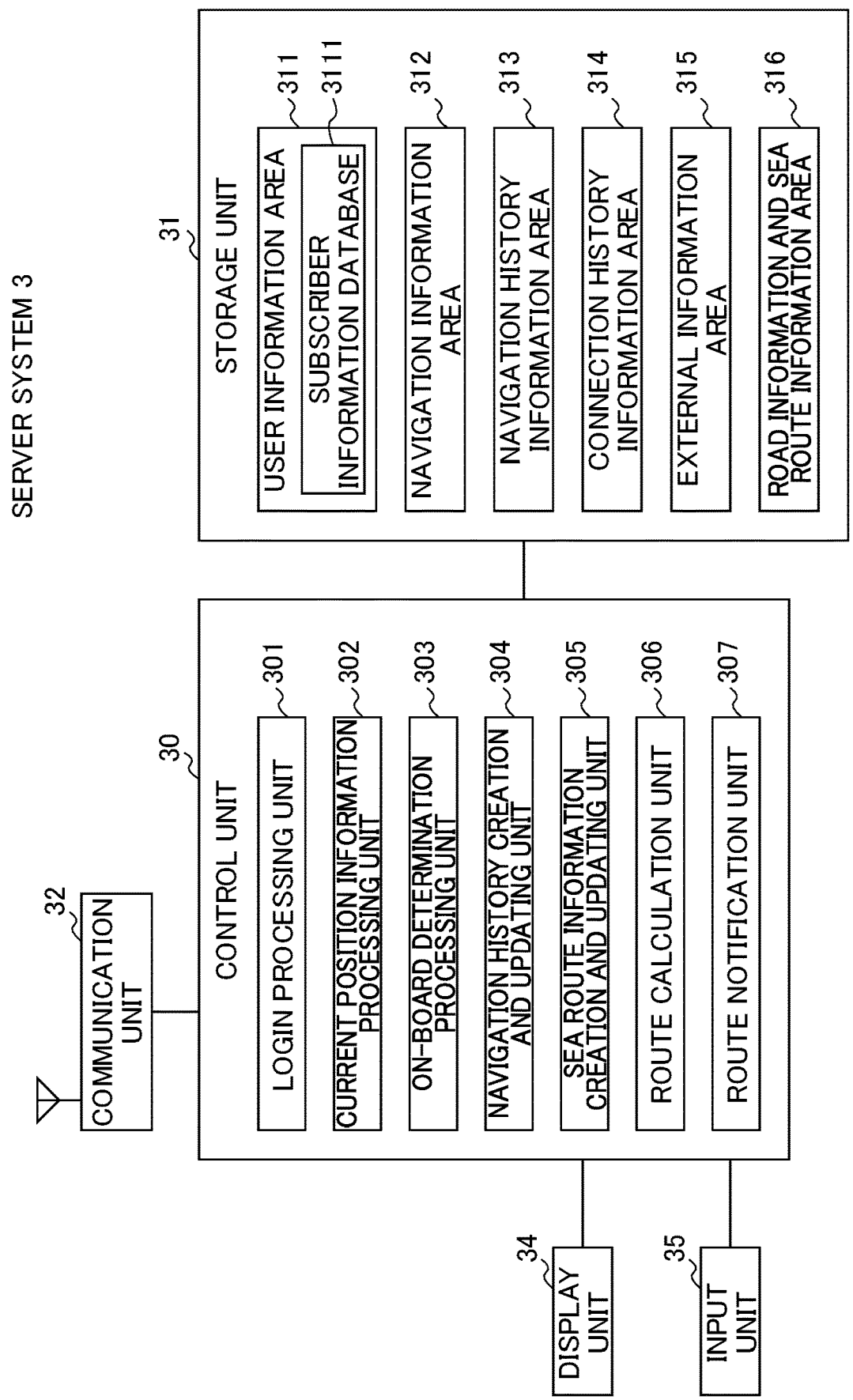
FIG. 3 is a diagram illustrating a configuration of a server system 3.

As illustrated in FIG. 3, the server system 3 includes at least a control unit 30, a storage unit 31, and a communication unit 32 and may further include a display unit 34 and an input unit 35 as necessary.

The control unit 30 is configured as a microprocessor including a CPU, a RAM, a ROM, an I/O, and the like. The CPU executes navigation programs read from the RAM, the ROM, or the storage unit 31, and during execution of the programs, reads information from the RAM, the ROM, and the storage unit 31, writes information to the RAM and the storage unit 31, and exchanges signals with the communication unit 32. The details thereof will be described later.

The storage unit 31 is configured as a semiconductor memory, a hard disk drive, or the like, and stores various items of information including an operating system (OS) and software called applications. Due to this, the storage unit 31 has secured therein various storage areas including a user information area 311, a navigation information area 312, a navigation history information area 313, a connection history information area 314, an external information area 315, and a road information and sea route information area 316.

The user information area 311 of the storage unit 31 stores a subscriber information database 3111 that manages vehicle information of each "vehicle ID" and manages user information (for example, a family structure, an age structure, a current address, and the like) of each "user ID".

The navigation information area 312 of the storage unit 31 stores road map information, road link information, and the like for navigation in advance, used during route guidance when the user is riding in the vehicle 1. The road map information includes road network data and the like including display map data for displaying a background such as roads and road maps, position information of nodes (for example, intersections, curves, endpoints, and the like) and type information thereof, position information of links which are routes connecting respective nodes and type information thereof, and link cost data and the like relating to cost information (for example, distance, required time, and the like) of all links. These items of information may be correlated with a table, a file, or the like for each item of information and may be stored in the corresponding table, file, and the like.

Similarly, the navigation information area 312 of the storage unit 31 include information such as display map data (nautical chart), shallow water, and the like serving as the background for displaying the sea route information and the like. These items of information may be correlated with a table, a file, or the like for each item of information and may be stored in the corresponding table, file, and the like.

The navigation history information area 313 of the storage unit 31 stores past time-series position information (hereinafter also referred to "navigation trajectory information") collected from the wireless communication terminal 2 together with a vessel ID and a vessel type (displacement) when the wireless communication terminal 2 is set to a sea route guidance mode by the navigation history creation and updating unit 304 to be described later. More specifically, a navigation record when the vessel type (displacement) is authenticated by short-range wireless communication and a navigation record when the vessel type (displacement) is authenticated by the user's manual input may be stored by applying a higher weight to the former record data so as to have "higher performance". For example, a weight of 1 is applied to the navigation record when the vessel type (displacement) is authenticated by short-range wireless communication, whereas a weight of 0.5, for example, is applied to the navigation record when the vessel type (displacement) is authenticated by the user's manual input.

The connection history information area 314 of the storage unit 31 stores a connection history record that manages position information, time information, destination information, the traveling direction of the vehicle 1 or the vessel transmitted periodically from the position information updating unit 202 of the wireless communication terminal 2 to the server system 3 for each user ID, each vehicle ID, and each vessel ID.

The external information area 315 of the storage unit 31 stores fishing gear installation information of a fixed fishing net, tide information, weather information, emergency information (sunken ship information), a live camera (Japan Coast Guard), and fishing regulation information (berley regulations or fishing prohibition) of each sea area, or the like. These items of information are collected appropriately from an information destination by the server system 3 and are updated to the latest information. These items of information may be correlated with a table, a file, or the like for each item of information and may be stored in the corresponding table, file, and the like. Moreover, the server system 3 may acquire these items of information as necessary from a server system or the like of the information destination.

The road information and sea route information area 316 of the storage unit 31 stores road information used when the route calculation unit 306 to be described later is in a land mode and the navigable sea route information, the sea route performance level, and the like corresponding to the vessel type (displacement) used when the route calculation unit 306 is in a marine mode. The sea route performance level will be described later.

The communication unit 32 has a communication protocol capable of performing wireless communication when transmitting and receiving data to and from the wireless communication terminal.

The control unit 30 executes respective programs for the route guidance and sea route guidance application to allow the server system 3 to function as predetermined means (hereinafter collectively referred to as a "route guidance and sea route guidance control unit"). Moreover, the control unit 30 executes respective programs for route guidance and sea route guidance to allow the server system 3 to execute predetermined steps (hereinafter collectively referred to as a "route guidance and sea route guidance control step").

Hereinafter, the functions of the control unit 30 will be described from the viewpoint of a route guidance and sea route guidance control unit. The description based on the viewpoint of the route guidance and sea route guidance control step (method) will not be provided since the same description is applied to the route guidance and sea route guidance control unit by replacing "unit" with "step".

As illustrated in FIG. 3, the control unit 30 includes a login processing unit 301, a current position information processing unit 302, an on-board determination processing unit 303, a navigation history creation and updating unit 304, a sea route information creation and updating unit 305, a route calculation unit 306, and a route notification unit 307.

<Login Processing Unit 301>

The login processing unit 301 executes a login process from the wireless communication terminal 2 to perform a process of connecting to the wireless communication terminal 2, and creates a connection history record for managing the position information, the time information, the traveling direction, the destination information, and the like transmitted from the wireless communication terminal 2 in the connection history information area 314. The information received from the wireless communication terminal 2 may include the vehicle information and the vehicle state when the user is riding in the vehicle 1 and may include the vessel information and the vessel state when the user is aboard the vessel 4.

<Current Position Information Processing Unit 302>

When the wireless communication terminal 2 is within the communication range of the cellular phone network, the current position information processing unit 302 updates the connection history record by adding the user ID, the current position information of the wireless communication terminal 2, the current time information, the vehicle state when the user is riding in the vehicle 1, and the vessel state and the like when the user is aboard the vessel 4 transmitted periodically from the position information updating unit 202 of the wireless communication terminal 2. When the wireless communication terminal 2 was outside the communication range of the cellular phone network and has re-entered the communication range of the cellular phone network, the current position information processing unit 302 receives the position information and the like that the wireless communication terminal 2 has recorded in the work area of the storage unit 21 when the wireless communication terminal 2 was outside the communication range from the wireless communication terminal 2 and updates the connection history record by adding the received information. By doing so, the position information and the like acquired until the vessel 4 returns to a port after departing from the port can be added to update the connection history record regardless of whether the wireless communication terminal 2 was within the communication range of the cellular phone network or outside the communication range. The navigation history creation and updating unit 305 to be described later creates the navigation trajectory information of the vessel 4 collected from the wireless communication terminal 2 together with reliability information thereof on the basis of the connection history record. Here, the reliability information can be determined, for example, using the input source indicating whether the vessel type (displacement) is automatically acquired by the short-range wireless unit 26 or is manually input by the user.

<On-Board Determination Processing Unit 303>

The on-board determination processing unit 303 determines a boarding/riding state indicating a state in which the user carrying the wireless communication terminal 2 is riding in the vehicle 1 or is aboard the vessel 4, a state in which the user is not riding (aboard) on the vehicle 1 or the vessel 4 (this state is referred to as "other state"), a state in which the user gets off the vehicle 1 and goes aboard the vessel 4, and a state in which the user gets off the vessel 4 and rides on the vehicle 1 on the basis of the connection information with the vehicle 1 or the vessel 4 received via the communication unit 32. The other state may be a walking state, a state of using other transportation means (for example, a train, a subway, an airplane, or the like), for example.

When it is determined that the user carrying the wireless communication terminal 2 is in the state of getting off the vehicle 1 and being aboard the vessel 4, the on-board determination processing unit 303 switches the route setting mode of the route calculation unit 306 from the land navigation to the marine navigation. As will be described later, the route calculation unit 306 retrieves and selects sea route information suitable for the vessel information (particularly the vessel's displacement) on the basis of the current position of the wireless communication terminal 2 (the current position of the vessel 4).

In contrast, when it is determined that the user carrying the wireless communication terminal 2 is in the state of getting off the vessel 4 and riding in the vehicle 1, the on-board determination processing unit 303 switches the route setting mode of the route calculation unit 306 from marine navigation to land navigation. As will be described later, the route calculation unit 306 calculates the route information on the basis of the current position of the wireless communication terminal 2 (the current position of the vehicle 1).

<Navigation History Creation and Updating Unit 304>

The navigation history creation and updating unit 304 creates the navigation trajectory information of the vessel 4 together with the vessel ID, the vessel type (displacement), and the reliability information of the displacement information on the basis of the connection history record and stores the navigation trajectory information in the navigation history information area 313 of the storage unit 31. When the on-board determination processing unit 303 determines that the user carrying the wireless communication terminal 2 has left the vessel 4 (the user has transitioned to a state other than the boarding state), the navigation history creation and updating unit 304 may create the navigation trajectory information on the basis of the connection history record by batch processing.

<Sea Route Information Creation and Updating Unit 305>

The sea route information creation and updating unit 305 updates the navigable sea route information corresponding to the vessel type (displacement) stored in the road information and sea route information area 316 of the storage unit 31 on the basis of the navigation trajectory information created by the navigation history creation and updating unit 304.

Road navigation uses a technology of absorbing measurement errors by plotting positions measured by GPS to a road position on the map according to the "map matching" technology. However, traceable marks like roads are not present at sea, and the marine navigation cannot use the map matching technology. Due to this, in the present invention, a sea route is displayed to be bolder by accumulating navigation records and the technology of performing matching on sea routes is not employed.

Figure 4C:
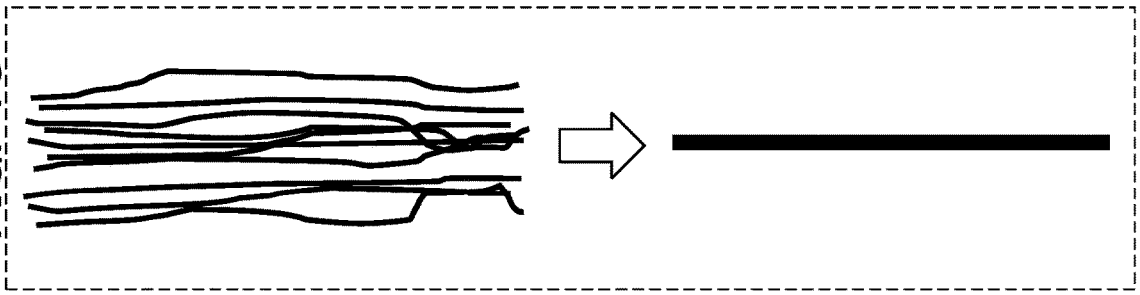
FIGS. 4A, 4B and 4C are diagrams illustrating an average value (for example, a line that connects the centers of a plurality of navigation trajectories) of all navigation trajectories of vessels 4 having the same displacement.
Figure 4B:
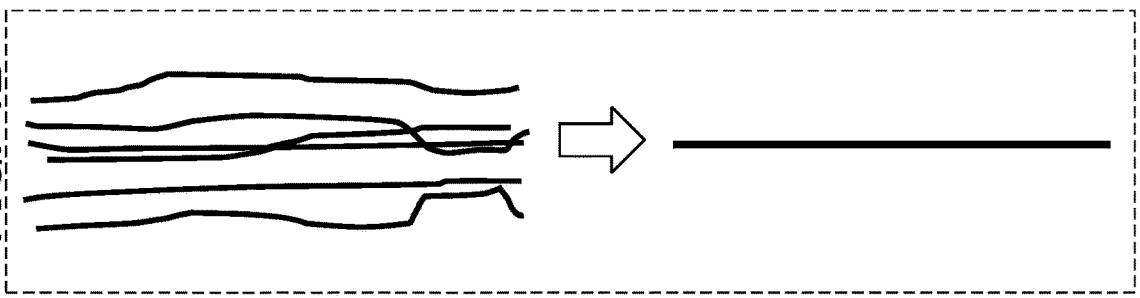
Figure 4A:
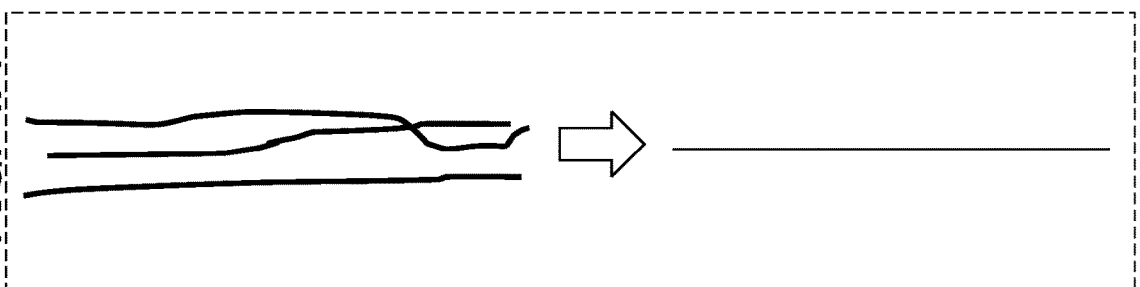
Figure 5:
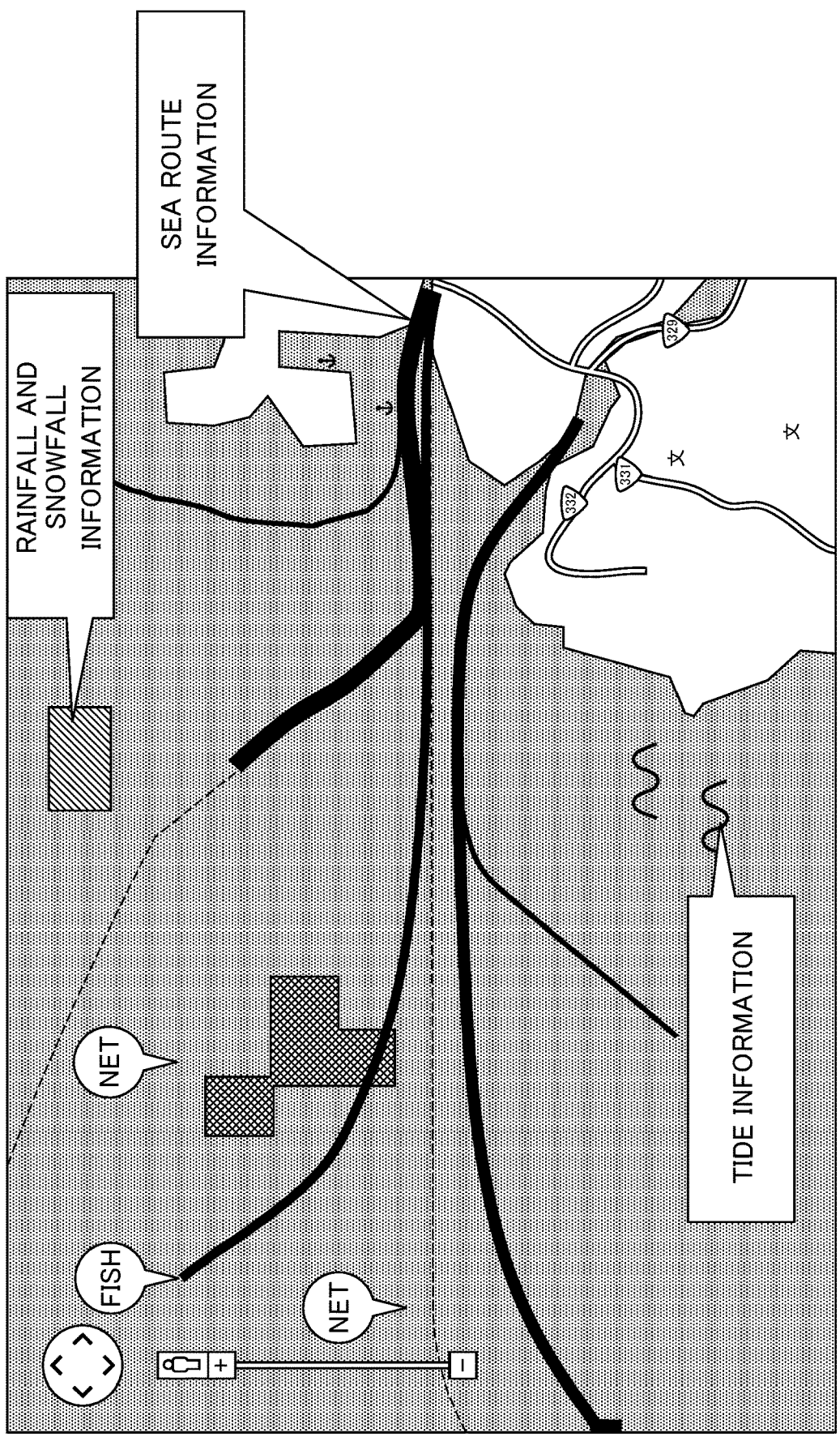
FIG. 5 is a diagram illustrating an example of a screen for displaying distributed sea route guidance, displayed on the wireless communication terminal 2.

Specifically, the sea route information creation and updating unit 305 groups the vessels 4 of which the vessel types (displacements) are regarded to be the same in a predetermined fixed period. Subsequently, the sea route information creation and updating unit 305 groups navigation trajectories which are regarded to be the same in the predetermined fixed period among the navigation trajectories of the vessels 4 classified to the same group. In this case, even when the vessels 4 having the same ID navigate along the navigation trajectories regarded to be the same, the respective navigation trajectories are handled as independent trajectories. Here, the fixed period may be set appropriately as necessary. Subsequently, as illustrated in FIGS. 4A, 4B, and 4C, the sea route information creation and updating unit 305 calculates an average value (for example, a line that connects the centers of a plurality of navigation trajectories) of all navigation trajectories which are regarded to be the same, of the vessels 4 which are regarded to have the same displacement and sets the average value as a navigable sea route of the vessels 4 of which the vessel types (the displacements) are regarded to be the same.

Furthermore, the sea route information creation and updating unit 305 sets the performance level of a sea route on the basis of the number of navigation trajectories grouped as being regarded to be the same among the navigation trajectories of the vessels 4 of which the vessel types (displacements) are regarded to be the same such that the smaller the number of navigation trajectories of the sea route, the smaller the performance level of the sea route whereas the larger the number of navigation trajectories of the sea route, the larger the performance level of the sea route. The performance level may be set on the basis of the absolute value of the number of navigation trajectories. The performance level may be set on the basis of the relative magnitude of the number of navigation trajectories.

The sea route information creation and updating unit 305 can set the magnitude of performance from performance level n to performance level 1 when the performance level is classified into n steps (n>1), for example. Navigation records are superimposed on a sea route having a large performance level and it is expected that the sea route having a large performance level is a sea route along which vessels can easily pass. Therefore, the sea route having a large performance level can be handled as a wide arterial road when compared to land roads. The number of steps of the performance level may be set appropriately as necessary. By doing so, as illustrated in FIGS. 4A, 4B, 4C and 5, the route guidance unit 205 of the wireless communication terminal 2 can display a nautical chart and a sea route such that a sea route having a small performance level is displayed as a narrow line and a sea route having a large performance level is displayed as a bold line.

Preferably, the sea route information creation and updating unit 305 accumulates the navigation trajectories by applying a reliability weight to the number of navigation trajectories when the vessel type (the displacement) was authenticated by short-range wireless communication and the number of navigation trajectories when the vessel type (the displacement) was authenticated by a user's manual input. More specifically, for example, when a reliability weight of 1 is applied to the number of navigation trajectories when the vessel type (the displacement) was authenticated by short-range wireless communication and a reliability weight of 0.5 is applied to the number of navigation trajectories when the vessel type (the displacement) was authenticated by a user's manual input, the number of grouped navigation trajectories when the vessel type was authenticated by a user's manual input may be counted as 0.5. The reliability weight value may be set appropriately as necessary.

<Vessels of which Vessel Types (Displacements) are Regarded to be the Same>

A plurality of ranges (upper and lower limits) of displacements for regarding the displacements to be the same may be set in advance. When two vessel's displacements belong to the same range, the sea route information creation and updating unit 305 can regard the two vessel's displacements to be the same. For example, when the displacement of a vessel of less than 20 tons is subdivided by the unit of 5 tons into displacements of less than 5 tons, displacements of between 5 tons or more and less than 10 tons, displacements of between 10 tons or more and less than 15 tons, and displacements of between 15 tons or more and less than 20 tons, if two vessel's displacements belong to the same subdivided range, the sea route information creation and updating unit 305 may regard the two vessel's displacements to be the same. Moreover, when the displacement of a vessel of between 20 tons or more and less than 50 tons is subdivided by the unit of 10 tons into displacements of between 20 tons or more and less than 30 tons, displacements of between 30 tons or more and less than 40 tons, and displacements of between 40 tons or more and less than 50 tons, if two vessel's displacements belong to the same subdivided range, the sea route information creation and updating unit 305 may regard the two vessel's displacements to be the same. The vessel's displacement range may be set appropriately in a similar manner. The sea route information creation and updating unit 305 may regard two vessel's displacements to be the same only when the two vessel's displacements are of the same value. The range (upper and lower limits) of displacements for regarding displacements to be the same may be set appropriately as necessary.

<Navigation Trajectories Regarded to be the Same>

When the navigation trajectories of two vessels 4 which are regarded to have the same displacement are within a predetermined allowable range, the sea route information creation and updating unit 305 may regard the two navigation trajectories to be the same navigation trajectories. The allowable range may be set appropriately as necessary depending on the magnitude of the vessel's displacement (for example, 100 m for vessels having a small displacement and 200 m for vessels having a large displacement).

<Display of Sea Route>

The thickness of a line indicating a sea route to be displayed on a nautical chart may be set in advance according to a performance level of the sea route. The thickness of the line is preferably set appropriately according to the scale of the nautical chart. By doing so, the route guidance unit 205 of the wireless communication terminal 2 displays the thickness of a line indicating the sea route according to the performance level of the sea route when displaying the sea route on the nautical chart.

<Updating of Sea Route Information>

As described above, the sea route information creation and updating unit 305 creates sea route information on the basis of the navigation trajectories of the vessels 4 of which the vessel types (displacements) are regarded to be the same in a predetermined fixed period. The sea route information creation and updating unit 305 may recreate the sea route information every predetermined period (for example, every month) and update the sea route information with the recreated information. Moreover, the number of navigation trajectories may be updated by adding a newly added navigation trajectory to the number of navigation trajectories calculated previously. In this case, since the number of navigation trajectories increases every time, the performance level of the sea route can be set on the basis of the relative magnitude of the number of navigation trajectories.

The predetermined period may be set appropriately as necessary.

<Route Calculation Unit 306>

When a user rides on the vehicle 1, the route calculation unit 306 calculates the route information from the current position of the vehicle 1 to a destination set by the user. When the route information is calculated, an optimal route is calculated using the transportation information and the map information stored in the navigation area of the storage unit 31 by taking various conditions such as an arrival time, the use of a toll road, and the like into consideration. Here, the optimal route is, for example, a route which best satisfies a target condition designated by the user such as a route in which the arrival time is the quickest, a route in which the distance is the shortest, a route in which a general road is prioritized, a route in which a toll road is prioritized, a route in which the toll of a toll road or the like is the smallest, or a route in which the CO2 emission is the smallest.

In contrast, when the user goes aboard the vessel 4, the route calculation unit 306 calculates the sea route guidance information in the following manner. Hereinafter, a processing unit of the route calculation unit 306 that calculates the sea route guidance information is also referred to as a sea route map information selection unit. The route calculation unit 306 (the sea route map information selection unit) of the server system 3 transmits suitable sea route information based on the vessel information (particularly, the vessel's displacement) to the wireless communication terminal 2 when it is determined on the basis of the information received from the connection information acquisition unit 203 of the wireless communication terminal 2 that the user is aboard the vehicle, for example. For example, the route calculation unit 306 (the sea route map information selection unit) searches the road information and sea route information area 316 of the storage unit 31 to retrieve the sea route information suitable for the vessel information (particularly the vessel's displacement) on the basis of the current position of the wireless communication terminal 2 (the current position of the vessel 4) and transmits the retrieved and selected sea route information to the wireless communication terminal 2 together with the performance level of the sea route.

When the vessel 4 is not equipped with automatic recognition means for recognizing the vessel type (the displacement) by proximity wireless communication or the like, the route calculation unit 306 (the sea route map information selection unit) selects the sea route information on the basis of the vessel type (the displacement) which is manually input by the user. In this case, since if a wrong displacement is input (reported) the vessel itself will be endangered and wrong information may be transmitted to other vessels depending on the navigation record as described above, the route calculation unit 306 (the sea route map information selection unit) may transmit the sea route information so as to correspond to a displacement larger than the manually input value. Moreover, when automatic recognition means for recognizing the vessel type (the displacement) based on proximity wireless communication or the like is not provided, the vessel type (the displacement) is not manually input, and the position information indicating that the user is at sea is uploaded from the wireless communication terminal 2 to the server system 3, the route calculation unit 306 (the sea route map information selection unit) may transmit the safest sea route map (that is, the sea route information for vessels having a large displacement) to the wireless communication terminal 2.

However, as described above, since the depth of water changes depending on the rise and fall of the tide, the navigable sea route changes depending on the conditions such as the date and time and the displacement. Moreover, a vessel may be unable to navigate along a sea route that passes over a fishing net. Moreover, it may be necessary to avoid a sea route on the basis of weather information (for example, wave information).

Due to this, the route calculation unit 306 (the sea route map information selection unit) provides the sea route information by referring to fishing gear installation information of a fixed fishing net or the like, tide information, weather information, emergency information (sunken ship information), a live camera (Japan Coast Guard), and fishing regulation information (berley regulations or fishing prohibition) of each sea area, or the like, stored in the external information area 315 of the storage unit 31. For example, the route calculation unit 306 (the sea route map information selection unit) performs a process of excluding a sea route in which the sea level is different from low tides to high tides and the vessel may be stranded on an underwater rock during low tides from the selected sea route information or outputting a warning by referring to the tide information at the present time point. Moreover, the route calculation unit 306

(the sea route map information selection unit) performs a process of excluding a sea route that may pass over a fishing net from the selected sea route information or outputting a warning by referring to the fishing gear installation information of a fixed fishing net or the like at the present time point. Subsequently, the route calculation unit 306 (the sea route map information selection unit) performs a process of excluding a sea route in which the vessel may pass through a danger zone from the selected sea route information or outputting a warning by referring to the weather information (for example, wave information).

Moreover, when there is a request for sea route information to a destination, for example, from the vessel 4 or the wireless communication terminal 2, the route calculation unit 306 (the sea route map information selection unit) selects the sea route information as described above and performs a process of excluding a dangerous sea route or outputting a warning. Moreover, the route calculation unit 306 may provide the sea route information in an alert state when it is determined that the vessel will be unable to pass a destination or a stopover or to return to a departure point on the basis of the fuel state and the mileage information obtained from the vessel information and the vessel state, for example. When the sea route information to the destination is not present, the route calculation unit 306 (the sea route map information selection unit) may select sea route information near the vessel.

Although not illustrated in the drawings, since base stations of a cellular phone network are not present at sea, the farther the vessel travels offshore, the higher the risk of being located outside the communication range. Therefore, the route calculation unit 306 (the sea route map information selection unit) can secure a minimum level of safety by collectively distributing a minimum necessary amount of safely navigable sea route information when distributing the first sea route information to the wireless communication terminal 2. When the wireless communication terminal 2 is within the communication range of the cellular phone network, the route calculation unit 306 (the sea route map information selection unit) can update the sea route information to the latest information and transmit the latest sea route information.

When the user gets off the vehicle 1 and goes aboard the vessel 4, as described above, the on-board determination processing unit 303 determines that the user carrying the wireless communication terminal 2 is aboard the vessel 4 and switches the route setting mode of the route calculation unit 306 from land navigation to marine navigation. By doing so, the route calculation unit 306 (the sea route map information selection unit) can retrieve and select sea route information suitable for the vessel information (particularly the vessel's displacement) on the basis of the current position of the wireless communication terminal 2 (the current position of the vessel 4).

In contrast, when it is determined that the user has disembarked from the vessel 4 and got in the vehicle 1, as described above, the on-board determination processing unit 303 determines that the user carrying the wireless communication terminal 2 is riding in the vehicle 1 and switches the route setting mode of the route calculation unit 306 from marine navigation to land navigation. By doing so, the route calculation unit 306 can calculate the route information on the basis of the current position of the wireless communication terminal 2 (the current position of the vehicle 1).

<Route Notification Unit 307>

The route notification unit 307 transmits the route information or the sea route guidance information calculated by the route setting unit 306 to the wireless communication terminal 2 via the communication unit 32. Even when the user gets off the vehicle 1 and travels by foot or using public transportation, the route guidance can be continued by the wireless communication terminal 2. Moreover, even when the user gets off the vehicle 1 and goes aboard the vessel 4, the route setting mode of the route calculation unit 306 can be switched from land navigation to marine navigation as described above. Therefore, the route calculation unit 306 (the sea route map information selection unit) calculates the sea route guidance information as described above, and the route notification unit 307 transmits the sea route guidance information calculated by the route calculation unit 306 to the wireless communication terminal 2 via the communication unit 32. As described above, even when the user gets off the vehicle 1 and goes aboard the vessel 4, the route guidance (sea route guidance) can be continued by the wireless communication terminal 2. In contrast, even when the user disembarks from the vessel 4 and rides the vehicle 1, route guidance (road guidance) can be continued by the wireless communication terminal 2.

Hereinabove, the embodiment of the respective functional units of the navigation system 100 according to the present invention has been described based on the configurations of the wireless communication terminal 2 and the server system 3. However, the embodiment of the respective functional units of the server system 3 according to the present invention may be deployed to be executed by one computer or a number of computers distributed to one location or a plurality of locations and connected to each other by a communication network. Moreover, the respective functional units may be configured using a plurality of virtual computers on a cloud.

The respective functions of the server system 3 can be executed by any computer. Therefore, a skilled person can appropriately design the manner in which the respective functions of the server system 3 are allocated to the computers. For example, the server system 3 may be a server system which includes a plurality of servers such as a Web server, an application server, and a database server, for example. In this case, for example, the login processing unit 301 and the route notification unit 307 may be executed by the Web server, the current position information processing unit 302, the on-board determination processing unit 303, and the navigation history creation and updating unit 304 may be executed by the application server, and the sea route information creation and updating unit 305 and the route calculation unit 306 may be executed by the database server.

(Operation of Navigation System 100)

Figure 6:
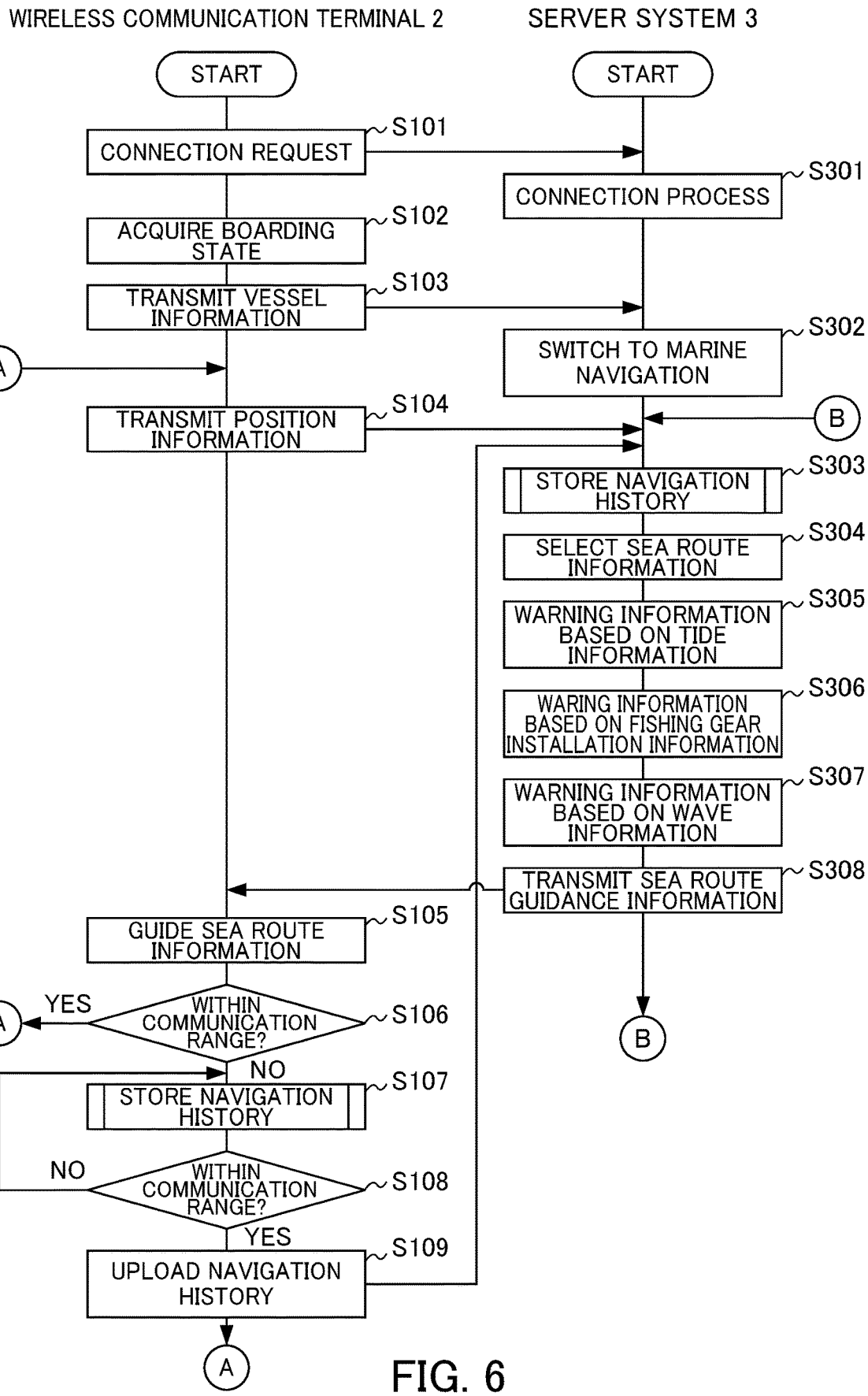
FIG. 6 is a flowchart illustrating the flow of a process of the navigation system 100.

Hereinabove, the configuration of the navigation system 100 has been described. Next, the operation of the navigation system 100 when the user is aboard the vessel 4 will be described. FIG. 6 is a flowchart illustrating the flow of a sea route guidance process of the navigation system 100.

The sea route guidance process of the navigation system 100 will be described with reference to FIG. 6. In step S101, the wireless communication terminal 2 (the connection processing unit 101) transmits a login request (a connection request) to the server system 3 and transmits a current position, a current time, and the like.

In step S301, the server system 3 (the login processing unit 301) performs a process of connecting to the wireless communication terminal 2 and creates a connection history record for managing the current position, the current time, and the like received from the wireless communication terminal 2 in the connection history information area 314.

In step S102, the wireless communication terminal 2 (the connection information acquisition unit 203) acquires a riding/boarding state indicating whether the user carrying the wireless communication terminal 2 is riding in the vehicle 1 or is aboard the vessel 4 via the short-range wireless unit 26.

In step S103, the wireless communication terminal 2 (the connection information acquisition unit 203) transmits the vehicle information and the vehicle state or the vessel information and the reliability thereof and the vessel state acquired from the vessel 4 when the user is aboard the vessel 4 to the server system 3 via the wireless unit 22 on the basis of the riding/boarding state acquired via the short-range wireless unit 26. In this example, the user is in a boarding state.

In step S302, the server system 3 (the on-board determination processing unit 303) determines that the user carrying the wireless communication terminal 2 is aboard the vessel 4 and switches the route setting mode of the route calculation unit 306 to marine navigation.

In step S104, the wireless communication terminal 2 (the position information updating unit 202) transmits the current position information, the current time information, the vessel state, and the like of the wireless communication terminal 2 to the server system 3.

In step S303, the server system 3 (the current position information processing unit 302) updates the connection history record by adding the user ID, the current position information of the wireless communication terminal 2, the current time information, the vessel state, and the like transmitted from the wireless communication terminal 2 (the position information updating unit 202). Moreover, the server system 3 (the current position information processing unit 302) collectively receives the position information and the like that the wireless communication terminal 2 has recorded in the work area of the storage unit 21 of the wireless communication terminal 2 when the wireless communication terminal 2 was outside the communication range, transmitted from the wireless communication terminal 2 (the position information updating unit 202) and adds the information to update the connection history record.

In step S304, the server system 3 (the route calculation unit 306) retrieves and selects the sea route information suitable for the vessel information (particularly the vessel's displacement) on the basis of the current position of the wireless communication terminal 2 (the current position of the vessel 4).

In step S305, the server system 3 (the route calculation unit 306) performs a process of excluding a sea route in which the vessel may be stranded on an underwater rock from the selected sea route information or outputting a warning by referring to the tide information at the present time point.

In step S306, the server system 3 (the route calculation unit 306) performs a process of excluding a sea route that may pass over a fishing net from the selected sea route information or outputting a warning by referring to the fishing gear installation information of a fixed fishing net or the like at the present time point.

In step S307, the server system 3 (the route calculation unit 306) performs a process of excluding a sea route in which the vessel may pass through a danger zone from the selected sea route information or outputting a warning by referring to the weather information (for example, wave information).

In step S308, the server system 3 (the route notification unit 307) transmits the sea route guidance information (the nautical chart and the navigable sea route information of the vessel 4) calculated by the route calculation unit 306 to the wireless communication terminal 2 via the communication unit 32. After that, the flow proceeds to step S303.

In step S105, the wireless communication terminal 2 (the route guidance unit 205) provides a guidance of navigable sea route information near the current position corresponding to the vessel's displacement on the basis of the sea route guidance information received from the server system 3.

In step S106, the wireless communication terminal 2 determines whether the terminal is within the communication range of the cellular phone network. The flow proceeds to step S104 when the wireless communication terminal 2 is within the communication range of the cellular phone network (Yes). The flow proceeds to step S107 when the wireless communication terminal 2 is outside the communication range of the cellular phone network (No).

In step S107, the wireless communication terminal 2 (the position information updating unit 202) records the user ID, the current position information of the wireless communication terminal 2, the current time information, the vessel state, and the like in the work area of the storage unit 21.

In step S108, the wireless communication terminal 2 determines whether the terminal is within the communication range of the cellular phone network. The flow proceeds to step S109 when the wireless communication terminal 2 is within the communication range of the cellular phone network (Yes). The flow proceeds to step S107 when the wireless communication terminal 2 is outside the communication range of the cellular phone network (No).

In step S109, the wireless communication terminal 2 (the position information updating unit 202) collectively uploads the position information and the like that the wireless communication terminal 2 has recorded in the work area when the terminal was outside the communication range of the cellular phone network to the server system 3.

In step S303, the server system 3 (the current position information processing unit 302) collectively receives the position information and the like that the wireless communication terminal 2 has recorded in the work area of the storage unit 21 when the terminal was outside the communication range from the wireless communication terminal 2 and adds the information to update the connection history record. After that, the flow proceeds to step S304.

According to the navigation system 100 described above, the following advantages are obtained.

(1) According to the navigation system 100 of the embodiment, it is possible to create and update the navigable sea route information for each size of the vessel 4 on the basis of the vessel size and the vessel navigation trajectory received from the wireless communication terminal 2. By doing so, it is possible to provide sea route information (a sea route map) having past records according to a vessel type using a system which can be mounted on a wireless communication terminal such as a smartphone instead of equipping a device capable of receiving AIS or a device such as a navigation system. It is possible to update the navigable sea route information for each vessel size on the basis of the size of the vessel 4 and the current position of the wireless communication terminal 2 (the current position of the vessel 4) received from the wireless communication terminal 2.

(2) According to the navigation system 100 of the embodiment, the navigable sea route information of each vessel size is updated on the basis of the reliability of the information on the vessel size. Due to this, it is possible to update the sea route information more appropriately on the basis of the reliability of information even when a wrong displacement is input (reported) by a user's manual input, for example.

(3) According to the navigation system 100 of the embodiment, the performance levels based on the past navigation records of the sea route information are stored, and the sea route information creation and updating unit 305 further updates the past navigation records of the navigable sea route information for each vessel size. Due to this, a sea route in which the past navigation record has a large performance level, for example, can be displayed as a bold line on the wireless communication terminal 2, and a safer sea route can be effectively presented to users like a wide arterial road on land, for example.

(4) According to the navigation method of the embodiment, similarly to the navigation system 100 of (1), it is possible to provide sea route information (a sea route map) having past records according to a vessel type using a system which can be mounted on a wireless communication terminal such as a smartphone instead of equipping a device capable of receiving AIS or a device such as a navigation system.

(5) According to the navigation method of the embodiment, similarly to the navigation system of (2), it is possible to update the sea route information more appropriately on the basis of the reliability of information even when a wrong displacement is input (reported) by a user's manual input, for example.

(6) According to the navigation method of the embodiment, similarly to the navigation system 100 of (3), a sea route in which the past navigation record has a large performance level can be displayed as a bold line on the wireless communication terminal 2, and a safer sea route can be effectively presented to users like a wide arterial road on land, for example.

(7) According to the navigation system 100 of the embodiment, the road information and sea route information area 316 of the storage unit 31 is searched on the basis of the size of the vessel 4 and the reliability of the information on the size of the vessel 4 received from the wireless communication terminal 2 and the navigable sea route map information of the vessel 4 is selected. Due to this, it is possible to select the sea route information suitable for the displacement of the vessel 4.

(8) According to the navigation system 100 of the embodiment, when the reliability of the information on the vessel size received from the wireless communication terminal 2 is low (for example, when the information is manually input), the information on the vessel size is changed to be larger than the received vessel size, and then, the road information area 316 of the storage unit 31 is searched to select the navigable sea route map information of the vessel. Due to this, it is possible to select a safe sea route map even when a wrong displacement is input (reported) by a user's manual input.

(9) According to the navigation system 100 of the embodiment, when the information on the vessel size is not input from the wireless communication terminal 2, the vessel size is changed to a predetermined size, and the road information and sea route information area 316 of the storage unit 31 is searched to select the navigable sea route map information of the vessel having the predetermined size. Due to this, even when the vessel size is not input, it is possible to select the safest sea route map, that is, the sea route information for vessels having a large displacement.

(10) According to the navigation system 100 of the embodiment, the road information and sea route information area 316 of the storage unit 31 further stores a performance level based on the past navigation records of the sea route information together with the navigable sea route information for each vessel size and the sea route map information distribution unit further distributes the sea route information selected by the sea route map information selection unit together with the performance level of the sea route information. Due to this, a sea route in which the past navigation record has a large performance level can be displayed as a bold line on the wireless communication terminal 2, and a safer sea route can be effectively presented to users like a wide arterial road on land, for example.

(11) According to the navigation method of the embodiment, the road information and sea route information area 316 of the storage unit 31 is searched on the basis of the size of the vessel 4 and the reliability of the information on the size of the vessel 4 received from the wireless communication terminal 2 and the navigable sea route map information of the vessel 4 is selected. Due to this, it is possible to select the sea route information suitable for the displacement of the vessel 4.

(12) According to the navigation method of the embodiment, when the reliability of the information on the vessel size received from the wireless communication terminal 2 is low (for example, when the information is manually input), the information on the vessel size is changed to be larger than the received vessel size, and then, the road information and sea route information area 316 of the storage unit 31 is searched to select the navigable sea route map information of the vessel. Due to this, it is possible to select a safe sea route map even when a wrong displacement is input (reported) by a user's manual input, for example.

(13) According to the navigation method of the embodiment, when the information on the vessel size is not input from the wireless communication terminal 2, the vessel size is changed to a predetermined size, and the road information and sea route information area 316 of the storage unit 31 is searched to select the navigable sea route map information of the vessel having the predetermined size. Due to this, even when the vessel size is not input, it is possible to select the safest sea route map, that is, the sea route information for vessels having a large displacement.

(14) According to the navigation method of the embodiment, the road information and sea route information area 316 of the storage unit 31 further stores a performance level based on the past navigation records of the sea route information together with the navigable sea route information for each vessel size and the sea route map information distribution step further involves distributing the sea route information selected by the sea route map information selection unit together with the performance level of the sea route information. Due to this, a sea route in which the past navigation record has a large performance level, for example, can be displayed as a bold line on the wireless communication terminal 2, and a safer sea route can be effectively presented to users like a wide arterial road on land, for example.

The navigation system of the present invention may be executed by hardware and may be executed by software. That is, the functional configurations illustrated in FIGS. 2 and 3 are merely examples and not particularly limited. That is, it is sufficient that the server system 3 has a function capable of executing a series of processes related to the navigation function of the present invention, and which functional block will be used for implementing this function is not particularly limited to the examples illustrated in FIGS. 2 and 3. One functional block may be configured as a single hardware component, may be configured as a single software component, or may be configured as a combination thereof.

When a series of processes are executed by software, programs that form the software are installed from a network or a recording medium into a computer or the like. The computer may be a computer included in dedicated hardware. Moreover, the computer may be a computer capable of executing various functions by installing various programs therein.

A recording medium including such a program may be configured as a recording medium provided to users in a state of being incorporated into an apparatus body as well as a removable medium 31 distributed separately from the apparatus body in order to provide programs to users. The removable medium 31 is configured as a magnetic disk (including a floppy disk), a blu-ray disc, an optical disc, a magneto-optical disk, or the like, for example. The optical disc is configured as a compact disk-read only memory (CD-ROM), a digital versatile disk (DVD), or the like, for example. The magneto-optical disk is configured as a mini-disk (MD) or the like. Moreover, the recording medium provided to users in a state of being incorporated into the apparatus body is configured as a hard disk or the like included in the storage unit 21 or 31 illustrated in FIG. 2 or 3 in which programs are recorded, for example.

EXPLANATION OF REFERENCE NUMERALS

100: Navigation system
1: Vehicle
2: Wireless communication terminal
20: Control unit
201: Connection processing unit
202: Position information updating unit
203: Connection information acquisition unit
204: Route setting unit
205: Route guidance unit
21: Storage unit
22: Wireless unit
23: Sensor unit
24: Display unit
25: Input unit
26: Short-range wireless unit
3: Server system
30: Control unit
301: Login processing unit
302: Current position information processing unit
303: On-board determination processing unit
304: Navigation history creation and updating unit
305: Sea route information creation and updating unit
306: Route calculation unit
307: Route notification unit
31: Storage unit
311: User information area
312: Navigation information area
313: Navigation history information area
314: Connection history information area
315: External information area
316: Road information and sea route information area
32: Communication unit
4: Vessel

The invention claimed is:

1. A server system which is communicably connected to a wireless communication terminal, the server system comprising:
a wireless unit;
a control unit; and
a storage unit that stores navigable sea route information for each vessel size, wherein
the control unit includes:
a processor; and
a memory storing a program, which when executed by the processor causes the control unit to operate as:
a vessel information receiving unit that receives position information of the wireless communication terminal and information on a vessel size of a vessel from the wireless communication terminal carried by a user who is aboard the vessel via the wireless unit;
a navigation history creation and updating unit that creates navigation trajectory information including time-series position information of the vessel so as to correspond to the vessel size; and
a sea route information creation and updating unit that updates the navigable sea route information for the each vessel size, stored in the storage unit on the basis of the navigation trajectory information created by the navigation history creation and updating unit, wherein
the vessel information receiving unit further receives reliability of the information on the vessel size from the wireless communication terminal, and
the sea route information creation and updating unit further updates the navigable sea route information for the each vessel size, stored in the storage unit, on the basis of the navigation trajectory information created by the navigation history creation and updating unit so as to correspond to the vessel size and the reliability of the information on the vessel size.

2. The server system according to claim 1, wherein
the storage unit further stores a performance level based on past navigation records of the sea route information together with the navigable sea route information for the each vessel size, and
the sea route information creation and updating unit further updates the performance level based on the past navigation records of the navigable sea route information for the each vessel size.

3. The server system according to claim 1, wherein
the storage unit further stores a performance level based on past navigation records of the sea route information together with the navigable sea route information for the each vessel size, and
the sea route information creation and updating unit further updates the performance level based on the past navigation records of the navigable sea route information for the each vessel size.

4. A sea route information creation and updating method wherein a server system includes a wireless unit, a storage unit that stores navigable sea route information for each vessel size, and a control unit including a processor and a memory storing a program, the server system is communicably connected to a wireless communication terminal, and the server system updates the navigable sea route information for the each vessel size, stored in the storage unit, the method, according to the program, causing the control unit to execute:
a vessel information receiving step of receiving position information of the wireless communication terminal and information on a vessel size of a vessel from the wireless communication terminal carried by a user who is aboard the vessel via the wireless unit;

a navigation history creation and updating step of creating navigation trajectory information including time-series position information of the vessel so as to correspond to the vessel size; and a sea route information creation and updating step of updating the navigable sea route information for the each vessel size, stored in the storage unit on the basis of the navigation trajectory information created in the navigation history creation and updating step, wherein the vessel information receiving step further involves receiving reliability of the information on the vessel size from the wireless communication terminal, and the sea route information creation and updating step further involves updating the navigable sea route information for the each vessel size, stored in the storage unit, on the basis of the navigation trajectory information created by the navigation history creation and updating step so as to correspond to the vessel size and the reliability of the information on the vessel size.

5. The sea route information creation and updating method according to claim 4, wherein the storage unit further stores a performance level based on past navigation records of the sea route information together with the navigable sea route information for the each vessel size, and the sea route information creation and updating step further involves updating the performance level based on the past navigation records of the navigable sea route information for the each vessel size.

6. The sea route information creation and updating method according to claim 4, wherein the storage unit further stores a performance level based on past navigation records of the sea route information together with the navigable sea route information for the each vessel size, and the sea route information creation and updating step further involves updating the performance level based on the past navigation records of the navigable sea route information for the each vessel size.

7. A server system which is communicably connected to a wireless communication terminal, the server system comprising:

a wireless unit;

a control unit; and a storage unit that stores navigable sea route information for each vessel size, wherein the control unit includes:

a processor; and a memory storing a program, which when executed by the processor causes the control unit to operate as:

a vessel information receiving unit that receives position information of the wireless communication terminal, information on a vessel size of a vessel, and reliability of the information on the vessel size from the wireless communication terminal carried by a user who is aboard the vessel via the wireless unit;

a sea route map information selection unit that selects navigable sea route information of the vessel from the storage unit on the basis of the vessel size and the reliability of the information on the vessel size received by the vessel information receiving unit; and a sea route map information distribution unit that distributes the sea route information selected by the sea route map information selection unit to the wireless communication terminal together with a nautical chart.

8. The server system according to claim 7, wherein the sea route map information selection unit further changes the information on the vessel size to be larger than a size corresponding to the information on the received vessel size when the reliability of the information on the vessel size received from the wireless communication terminal is low to thereby select limited sea route information in which the depth of water is deeper than that of the navigable sea route information of the vessel corresponding to the received vessel size from the storage unit.

9. The server system according to claim 8, wherein the storage unit further stores a performance level based on past navigation records of the sea route information together with the navigable sea route information for the each vessel size, and the sea route map information distribution unit further distributes the sea route information selected by the sea route map information selection unit together with the performance level of the sea route information.

10. The server system according to claim 7, wherein the sea route map information selection unit further changes the vessel size to a predetermined size when the information on the vessel size is not input from the wireless communication terminal and selects the navigable sea route information of the vessel from the storage unit.

11. The server system according to claim 10, wherein the storage unit further stores a performance level based on past navigation records of the sea route information together with the navigable sea route information for the each vessel size, and the sea route map information distribution unit further distributes the sea route information selected by the sea route map information selection unit together with the performance level of the sea route information.

12. The server system according to claim 7, wherein the storage unit further stores a performance level based on past navigation records of the sea route information together with the navigable sea route information for the each vessel size, and the sea route map information distribution unit further distributes the sea route information selected by the sea route map information selection unit together with the performance level of the sea route information.

13. A sea route map information providing method for providing sea route map information to a wireless communication terminal to which a server system including a wireless unit, a storage unit that stores navigable sea route information for each vessel size, and a control unit including a processor and a memory storing a program is communicably connected, the method, according to the program, causing the control unit to execute:

a vessel information receiving step of receiving position information of the wireless communication terminal, information on a vessel size of a vessel, and reliability of the information on the vessel size from the wireless communication terminal carried by a user who is aboard the vessel via the wireless unit;

a sea route map information selection step of selecting navigable sea route information of the vessel from the storage unit on the basis of the vessel size and the reliability of the information on the vessel size received in the vessel information receiving step; and a sea route map information distribution step of distributing the sea route information selected in the sea route map information selection step to the wireless communication terminal together with a nautical chart.

14. The sea route map information providing method according to claim 13, wherein
the sea route map information selection step further involves changing the information on the vessel size to be larger than a size corresponding to the information on the received vessel size when the reliability of the information on the vessel size received from the wireless communication terminal is low to thereby select limited sea route information in which the depth of water is deeper than that of the navigable sea route information of the vessel corresponding to the received vessel size from the storage unit.

15. The sea route map information providing method according to claim 14, wherein
the storage unit further stores a performance level based on past navigation records of the sea route information together with the navigable sea route information for the each vessel size, and
the sea route map information distribution step further involves distributing the sea route information selected in the sea route map information selection step together with the performance level of the sea route information.

16. The sea route map information providing method according to claim 13, wherein
the sea route map information selection step further involves changing the vessel size to a predetermined size when the information on the vessel size is not input in the vessel information receiving step and selecting the navigable sea route information of the vessel from the storage unit.

17. The sea route map information providing method according to claim 16, wherein
the storage unit further stores a performance level based on past navigation records of the sea route information together with the navigable sea route information for the each vessel size, and
the sea route map information distribution step further involves distributing the sea route information selected in the sea route map information selection step together with the performance level of the sea route information.

18. The sea route map information providing method according to claim 13, wherein
the storage unit further stores a performance level based on past navigation records of the sea route information together with the navigable sea route information for the each vessel size, and
the sea route map information distribution step further involves distributing the sea route information selected in the sea route map information selection step together with the performance level of the sea route information.

\* \* \* \* \*